Dec. 25, 1951  S. M. PARKER  2,580,122
FLUID PRESSURE REMOTE CONTROL SYSTEM
Filed July 3, 1944  3 Sheets-Sheet 2
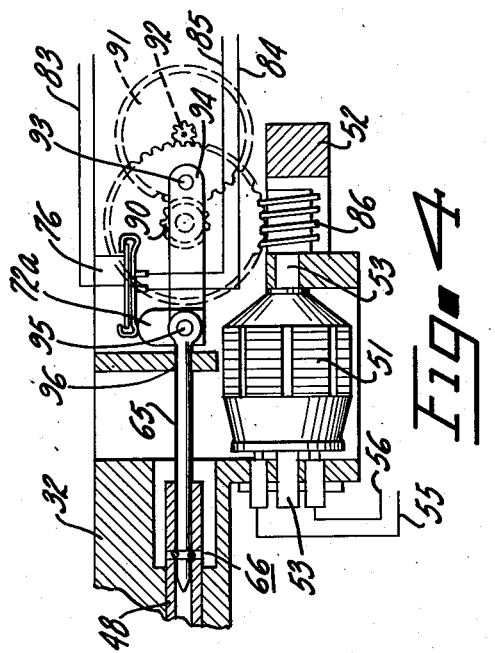
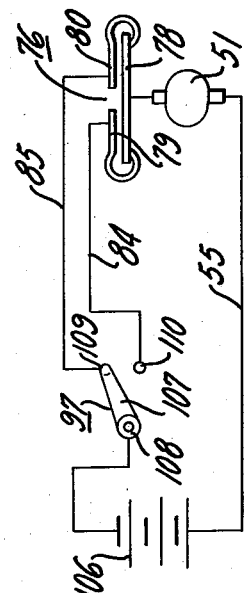
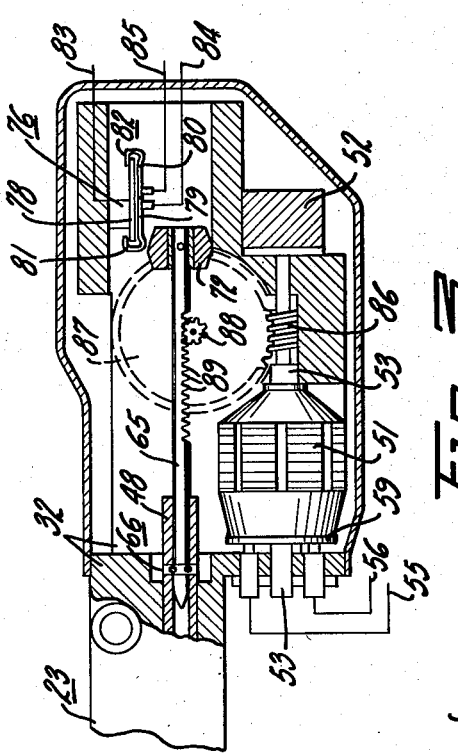
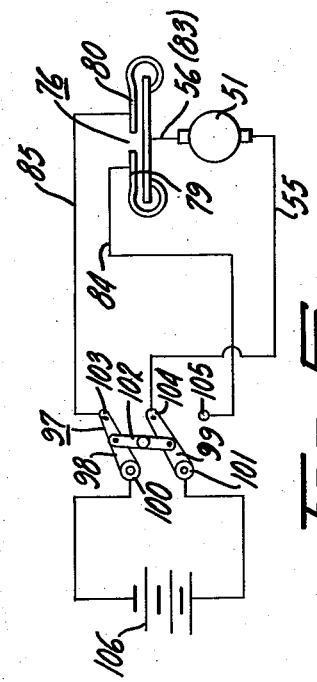
INVENTOR
SYDNEY MACDONALD PARKER
BY
Cecil F. Arens
ATTORNEY

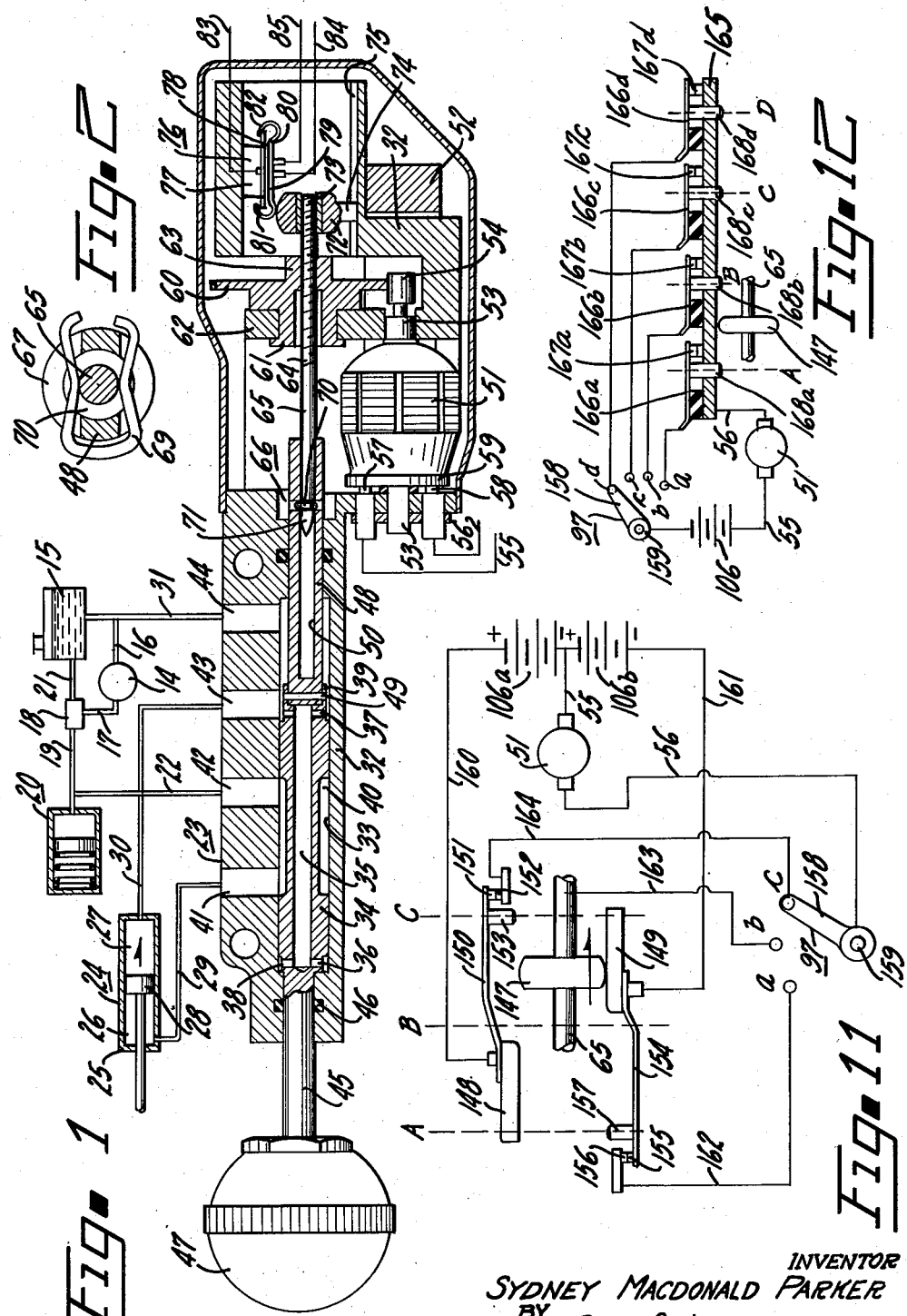

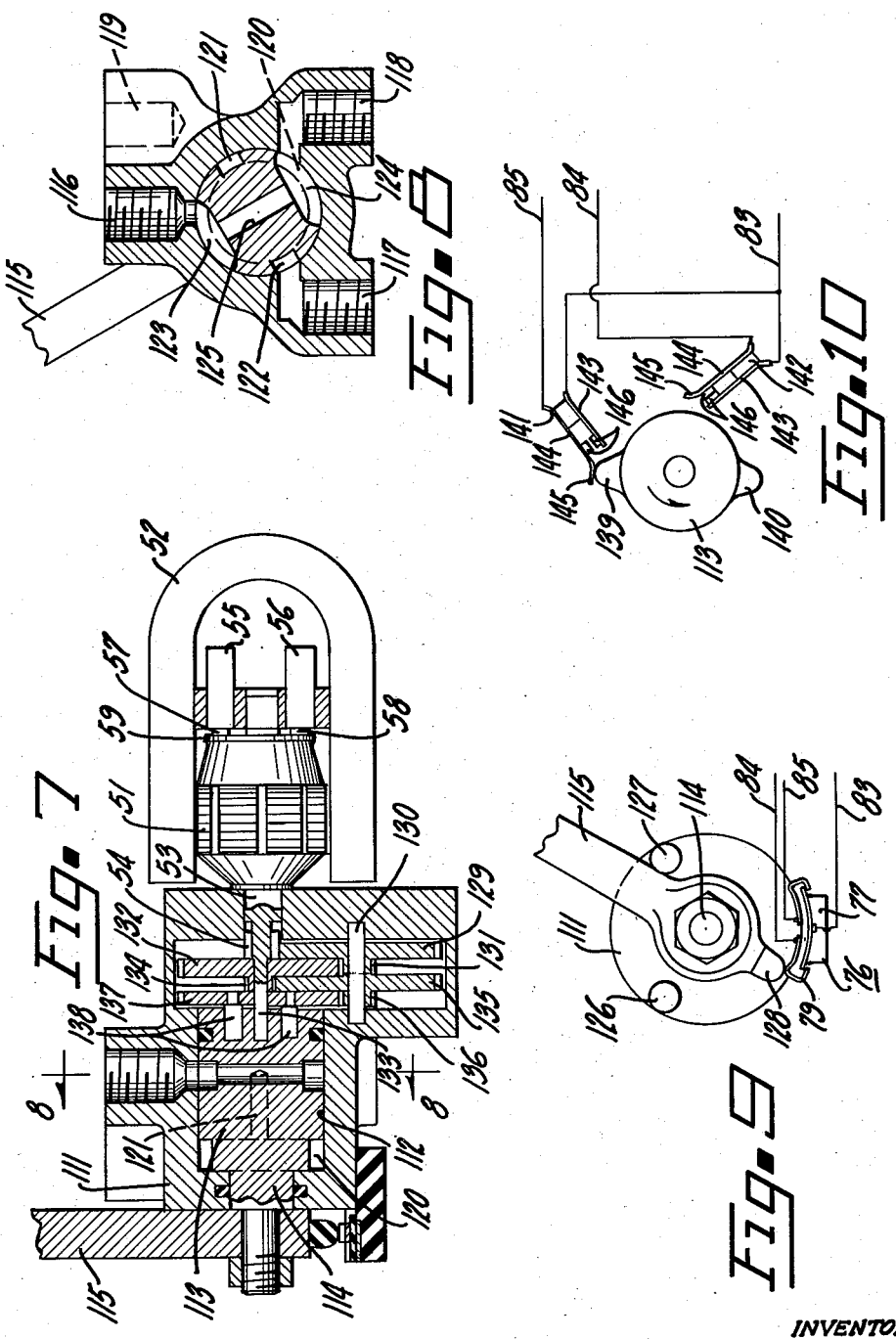

Patented Dec. 25, 1951

2,580,122

UNITED STATES PATENT OFFICE 2,580,122

FLUID PRESSURE REMOTE CONTROL SYSTEM

Sydney MacDonald Parker, Leamington Spa, England, assignor to Automotive Products Company Limited, Leamington Spa, England Application July 3, 1944, Serial No. 543,254
In Great Britain February 26, 1943

5 Claims. (Cl. 137—139)

This invention relates to fluid pressure remote control systems of the kind in which a source of pressure such as a pump or compressor, a hydraulic accumulator or a compressed gas storage container is adapted to be connected to a motor unit or to any one of a plurality of motor units by the operation of a control valve or control valves, which control valve or valves is or are adapted to be controlled from a remote point by an operator, so as to avoid the need for taking the pipe-lines which carry the operating fluid to the place occupied by the operator. The motor units may be of the type which is movable in either direction by the fluid pressure, or of the type movable in one direction only by the fluid pressure and in the other direction by energy stored in a spring or equivalent, the control valves being of an appropriate type in each case.

The object of the invention is to provide a control system in which the control valves are actuated electrically, the control circuits being made at the initiation of each control valve movement by manual means, and broken at the completion of the resulting movement of the control valve.

In a fluid pressure actuated remote control system of the kind referred to, according to the invention a control valve, controlling the flow of working fluid to a motor unit of the system, is operated electrically by a rotary electric motor, the supply of current to said electric motor being controlled by a remote switch for bringing said electric motor into action, and by an automatic switch operated in common with the valve for cutting off the supply of current to the electric motor when the valve has been moved to a predetermined position.

As a further aspect of the invention a fluid pressure actuated remote control system of the kind referred to is provided, wherein a control valve, controlling the flow of working fluid to a motor unit of the system, has a plurality of operating positions to which it is moved by a rotary electric motor, the supply of current to said motor being controlled by a remote switch for bringing said electric motor into action, and by a plurality of automatic switches, one for each working position of the valve, said switches being operated in common with the valve and being arranged to cut off the supply of current to the electric motor when the valve has reached the corresponding position.

Further, the improved fluid pressure actuated remote control system may have in combination with a double-acting fluid pressure motor unit, a flow-reversing control valve for connecting either working space of said motor unit to a source of pressure fluid, wherein said control valve is actuated by a rotary electric motor, a remote switch serving to initiate the operation of said electric motor to change the setting of the control valve, and an automatic switch operated by the electric motor acting to cut off the supply of current to the electric motor when the control valve reaches the desired new setting.

As a further feature of the invention there is provided for a double-acting motor unit of a fluid pressure actuated remote control system, a reversing control valve comprising a piston valve member slidable longitudinally within a bore in a body so as to cooperate with ports in said bore, a rotary electric motor, speed reducing mechanism connecting the electric motor with the valve member so that many revolutions of said motor are necessary to move the valve member from one end position to the other, a remote switch controlling the supply of current to the electric motor, and at least two automatic switches operated by, or in common with, the control valve member, and arranged to cut off the supply of current to the motor when the valve member reaches its two end positions. Preferably reduction gearing connecting the electric motor with the valve member incorporates a clutch connection enabling the valve member to be moved manually, when desired, independently of the electric motor. This clutch connection conveniently comprises a pair of telescopically slidable members, the inner of which is grooved for engagement by a spring clip carried by the outer telescopic member. The valve member may thus be drilled axially to form the outer of the telescopic members and to receive a rod which is moved axially by the electric motor.

If desired the piston valve member may be caused to reciprocate by a crank and connecting rod mechanism driven by the electric motor or by a rack and pinion mechanism.

The electric motor may be arranged to rotate in either direction, depending upon the position to which the remote switch is set. Alternatively the electric motor may be non-reversing and may be connected operatively with the valve by crank or equivalent mechanism, said motor being provided with a plurality of feed connections, any one of which can be selected by the remote switch, and each of which contains a normally closed automatic switch, the current being fed to the electric motor through the selected feed connection until the automatic switch corresponding thereto is opened by the electric motor as the valve member reaches the desired position.

The invention is illustrated in the accompanying diagrammatic drawings, which show several arrangements by way of example, and in which:

Figure 1 is a sectional side elevation of an electrically operated piston valve unit, the associated liquid pressure remote control system being indicated to a much reduced scale;

Figure 2 is a transverse section of the clutch embodied in Figure 1, drawn to an enlarged scale;

Figure 3 is a fragmentary sectional elevation of a modified form of electrical valve-operating means;

Figure 4 is a similar view of another modified arrangement;

Figure 5 is a typical electric circuit for use where a reversing electric motor is employed;

Figure 6 shows a corresponding circuit for a uni-directional or non-reversing electric motor;

Figure 7 is a sectional elevation showing an electric motor drive used in conjunction with a flow-reversing valve of the oscillatory type;

Figure 8 is a sectional elevation taken on the line 8—8 of Figure 7;

Figure 9 is an end view of the valve showing the electrical contact device;

Figure 10 is a diagram showing a modified contact arrangement suitable for use where the valve member moves in angular steps all in the same direction;

Figure 11 is a diagram of an arrangement for electrically actuating a three-position piston valve by means of a reversing electric motor; and Figure 12 is a diagram of an arrangement suitable for operating a four-position valve by means of a non-reversing driving mechanism, such, for instance, as that shown in Figure 4.

The hydraulic remote control system shown diagrammatically in Figure 1 comprises a pump 14, which is driven by any suitable means and is fed with working liquid from a reservoir 15 through an inlet pipe 16. The delivery pipe 17 of the pump leads to a cut-out valve 18 of the well-known construction having an outlet connection 19 leading to a hydraulic accumulator 20 and also a by-pass connection 21 for returning unwanted working liquid to the reservoir 15 when the accumulator 20 is fully charged. A pressure supply connection 22 leads from the accumulator 20 to a reversing valve of the piston type indicated generally at 23. This valve controls the flow of pressure liquid to a double-acting motor unit 24 having a cylinder 25, the interior of which is divided into two working spaces 26 and 27 by a piston 28. The working spaces 26 and 27 are connected with the valve 23 by pipes 29 and 30 respectively. The reservoir 15 is also connected with the valve 23 by a pipe 31.

The reversing valve 23 comprises a body 32 formed with a longitudinal bore 33 within which a piston valve member 34 is freely slidable in a substantially liquid-tight manner. The piston valve member 34 is drilled from one end to form a longitudinal passage 35 communicating by radial passages 36 and 37 with clearance spaces 38 and 39 respectively produced by reducing the end parts of the valve member 34. Intermediate its ends the valve member 34 is formed externally with an elongated circumferential recess 40. The bore 33 in the body 32 has a longitudinal series of three equi-distantly spaced ports 41, 42 and 43 and a passage 44, these being connected respectively to the pipe 29, to the pipe 22, to the pipe 30, and to the pipe 31, as will be seen in Figure 1. The outer end of the piston valve member 34 is reduced in diameter to form a stem 45, which extends through a packing ring 46 and is provided at its extremity with a knob 47 to permit manual operation of the valve 23 should this become necessary. To the opposite end of the valve member 34 a coupling rod 48 is secured by means of a diametral pin 49, said coupling rod 48 being arranged to close the longitudinal passage 35 and being itself formed for nearly its whole length with an axial bore 50. It will be seen that the valve member 34 has two operative positions. In the left-hand position, as shown, pressure liquid received from the accumulator 20 through the pipe 22 flows through the port 42, along the recess 40, through the port 41 and pipe 29 to the working space 26 of the motor unit 24. This causes the piston 28 to move to the right and at the same time the liquid which is rejected from the space 27 flows through the pipe 30 and back to the reservoir 15 by way of the port 43, the space 39, the port 44 and the pipe 31. In its other, or right-hand, position the recess 40 connects together the ports 42 and 43; the port 41 becomes connected with the reservoir 15 by way of the space 38, the longitudinal passage 35, the space 39, the passage 44 and the pipe 31. Thus pressure liquid from the accumulator is fed to the working space 27 of the motor unit and the piston 28 is then caused to move to the extreme left-hand end of its stroke.

The valve member 34 is normally operated by electrical means, as this enables the valve 23 to be installed reasonably close to the motor unit 24 and the other parts of the hydraulic remote control system, thus keeping the pipes as short as possible so as to reduce correspondingly the weight, frictional loss, cost, vulnerability and other undesirable factors. The driving means for the valve 23 comprises a rotary electric motor having a wound high-speed armature 51 rotating in a magnetic field produced by a permanent magnet 52 of the customary U type. The armature 51 has a shaft 53 mounted in suitable bearings and provided at its extremity with a driving pinion 54. Electric current is fed to the armature 51 from motor wires 55 and 56 by means of a pair of resiliently mounted carbon brushes 57 and 58 co-operating with a commutator 59 of the disc type. The driving pinion 54 is in mesh with a driven gear wheel 60 having a collar 61 which is rotatable in a fixed bearing 62; at its opposite end the driven wheel 60 is provided with a nut portion 63 which is internally screw-threaded for engagement with a corresponding screw-thread 64 upon a driving rod 65. The left-hand end of this driving rod is telescopically slidable within the coupling rod 48 and is connected operatively therewith by means of a non-positive clutch device indicated generally at 66. The construction of this will be seen more clearly in Figure 2. The coupling rod 48 is formed at its upper and lower parts with aligned sector-shaped slots or notches 67 and 68 for the accommodation of the limbs of a somewhat U-shaped wire clip 69 composed of resilient material. At the appropriate position the driving rod 65 has a circumferential groove 70 adapted to be engaged by the clip 69. Thus the clip 69 normally forms a driving connection between the rod 65 and the coupling rod 48, the force required to slide the valve member 34 being relatively small owing to the fact that it is in a state of balance with respect to the pressure of the liquid in the system. However, the sides of the groove 70 are suitably sloped, so that by exerting manual force upon the knob 47 the clip 69 can be caused to ride out of the groove 70, thus disconnecting the valve member 34 from the driving rod 65. The extremity of the latter is pointed, as indicated at 71, so as to enable the clip 69 to pass readily on to the rod 65 for re-engagement with the groove 70. The clutch re-engages automatically if the motor is operated to cause the rod to follow up the valve member.

At its opposite end the driving rod 65 is secured firmly to a collar 72 by means of a pin 73, the lower part of said collar having a projection 74, which slides along a groove 75 in the body 32 so as to prevent rotation of the driving rod 65 without restricting its axial movement. Thus as the armature 51 rotates it drives the gear wheel 69, and the screw and nut device 63, 64 consequently causes the driving rod 65 to be moved axially at a slow rate, the direction depending upon the direction of rotation of the armature 51.

In order to control the armature 51 and prevent it from over-running in either direction an automatic switch device is provided and is indicated generally at 76. It comprises a block 77 of insulating material carrying a common contact member 78 in the form of a plate. It also carries a pair of spring contact members 79 and 80, which are of somewhat J-shape, so that their curved extremities 81 and 82 tend to engage with the corresponding ends of the plate 78. These extremities are, however, bulged downwards, as will be seen in Figure 1, so that when the collar 72 reaches the end of its stroke in either direction it engages with the downwardly bulged portion of the corresponding contact member 79 or 80, and presses the extremity thereof upwards out of engagement with the plate 78. When the collar 72 is moved in the opposite direction, however, it passes out of engagement with the bulged portion and contact is once more re-established between the contact member 79 or 80 and the plate 78. A wire 83 leads from the plate 78 and a pair of wires 84 and 85 lead from the contact members 79 and 80 respectively. For the valve device shown in Figure 1 it is, of course, necessary to reverse the direction of rotation of the armature 51 for each successive stroke of the driving rod 65, and the electrical connections for bringing this about will be described hereinafter, more particularly in conjunction with Figure 5.

A modified form of speed-reducing mechanism for actuating the valve member 34 is shown in Figure 3; the valve 23 itself is not shown in its entirety, but is the same as that in Figure 1. In this instance the shaft 53 of the electric motor 51, 52 is formed or fitted with a worm 86 running in mesh with a worm-wheel 87, which latter is pivotally mounted upon the body 32. Secured to the worm-wheel 87 is a driving pinion 88, the teeth of which are in meshing engagement with a set of rack teeth 89 cut in the driving rod 65. As in the previous example, said driving rod is connected operatively with the coupling rod 48 by means of a disconnectible clutch device 66. A collar 72 secured to the outer end of the driving rod 65 serves to actuate an automatic switch 76 in the same manner as that described above, the same reference numerals being used for the parts. It will be seen that when current is fed to the motor armature 51 through wires 55 and 56, the worm 86 drives the worm-wheel 87 and this rotates the pinion 88, thus moving the driving rod 65 longitudinally at a slow rate, the direction of movement depending upon the direction of current flow through the armature.

The arrangement shown in Figure 4 is somewhat similar in general construction, but is adapted to operate without the necessity of reversing the direction of the motor armature 51. As before, the motor shaft 53 is provided with a worm-wheel 87. This is fitted with a pinion 90 running in mesh with a toothed crank disc 91, the shaft of which is indicated at 92. A crank pin 93 carried by the disc 91 serves for the pivotal attachment of a connecting rod 94 coupled at its opposite end to the driving rod 65 by means of a pivotal connection 95. In order to preserve the alignment of the driving rod 65 the latter is snugly slidable through a hole 96 formed in the body 32. A block 72a secured to the driving rod 65 serves to actuate an automatic switch 76 of the form above described so as to break the connection between the wire 83 and the wire 84 when the crank pin 93 is in its extreme left-hand position, and to break the connection between the wire 83 and the wire 85 when the crank pin 93 is in its extreme right-hand position.

The rudimentary circuit for operating a reversible rotary electric motor is shown in Figure 5, this being applicable, for instance, to the valve devices of Figures 1 and 3, although the valve device of Figure 4 can also be made to reverse in the same manner if desired. For controlling the motor armature 51 a switch, herein referred to as the remote switch, is employed and is indicated generally at 97. In this example the remote switch is of the well-known reversing type comprising a pair of switch arms 98 and 99 pivotally mounted at 100 and 101 and actuated by an insulating bridge member 102. In one operative position the arms 98 and 99 co-operate respectively with contact studs 103 and 104, while by moving the bridge 102 downwards said arms respectively co-operate with studs 104 and 105. The system is fed with current from a battery 106 connected across the arms 98 and 99. The stud 103 is connected to the wire 85 and therefore leads to the movable contact member 80; the stud 105 similarly connects by the wire 84 to the contact member 79; while the contact stud 104 is joined by a wire, say 55, leading to the motor armature 51, the other wire 56 then being connected to the contact plate 78. As the motor is of the permanent magnet type, it will be clear that the armature 51 will run in one direction or the other, depending upon the direction in which the current is supplied, and it is therefore important that the battery 106 should have its polarity correctly arranged to suit the motor and the automatic switch 76. With the remote switch 97 set to the position shown in Figure 5 the motor 51 receives its current through the movable contact member 80 and therefore moves the driving rod 65 towards the right until, as the end of the stroke of said driving rod is reached, the contact member 80 is separated from the plate 78 and breaks the circuit through the motor armature 51. The device thus remains stable until the remote switch 97 is moved to its other position; current is then received in the opposite direction through the contact member 79 and this drives the motor back until the point is reached where the circuit through the contact member 79 is broken. It will thus be seen that the motor armature 51 acts automatically to move the valve member 34 to a position corresponding with the setting of the remote switch 97 and then the automatic switch 76 shuts off the supply of current to the motor.

Where the arrangement shown in Figure 4, or an equivalent mechanism such as a rotatable cam (not shown), is used, a simpler form of circuit such as that in Figure 6 can be employed. In this case the remote switch 97 is of the single-pole two-way type, having a switch arm 107 pivotally mounted at 108 and adapted to co-operate with either one of a pair of studs 109 and 110. These are connected by the wires 85 and 84 respectively with the contact members 80 and 79 of the automatic switch 76. One pole of the battery 106 leads directly to the armature 51 by the wire 55, while the other is connected to the switch arm 107. Thus when the switch arm is in the position shown, current flows to the motor by way of the contact member 80, and the armature 51 therefore rotates in a given direction until the contact member 80 is pressed out of engagement with the plate 78; this, of course, occurs when the valve member 34 reaches the corresponding operating position. By moving the switch arm 107 into engagement with the stud 110 current flows to the motor in the same direction as before, but through the contact member 79, so that the rotation of the motor continues until the crank arm 93 or equivalent mechanism reaches a position corresponding to the opposite setting of the valve member 34, whereupon the contact member 80 leaves the plate 78 and again breaks the supply of current to the motor.

The invention is also applicable to angularly movable valves of hydraulic and other fluid pressure remote control systems, and an example of this form of valve actuated by a rotary electric motor is shown in Figures 7 to 9. The valve itself is of ordinary construction and comprises briefly a body 111 formed with a bore 112 containing a valve plug or member 113. This member has a stem 114 projecting through the end wall of the body 111 and provided with an operating handle 115 in case it should be necessary to change the setting of the valve manually. The body 111 has four connections, three of which are in a common plane and are indicated at 116, 117 and 118 in Figure 8. They communicate with corresponding ports in the bore 112, the connection 116 being fed with pressure liquid from the accumulator, while the connections 117 and 118 lead to the working spaces of the motor unit. A fourth connection 119 is in permanent communication with an annular space 120 formed by reducing the end part of the valve member 113, a pair of longitudinal grooves 121 and 122 being cut in the surface of the valve member 113 so as to lead into the annular space 120. At a position in line with the connections 116, 117 and 118 the valve member 113 has a pair of diametrically opposite recesses 123 and 124 each extending for nearly a quarter of the circumference of the valve member, said recesses being connected together by a diametral passage 125. It will be seen that when the valve member is in the position shown in Figure 8 pressure liquid from the connection 116 passes through the passage 125 to the connection 118 and thence to the corresponding working space of the motor unit; at the same time the other working space is in free communication with the reservoir by way of the connection 117, groove 122, annular space 120 and connection 119. When the valve member 113 is moved in a clockwise direction, as viewed in Figure 8, through an angle of nearly a right angle, the recess 123 remains in communication with the connection 116, but the recess 124 passes into communication with the connection 117; at the same time the groove 121 registers with the connection 118. Therefore the connection 117 is fed with pressure liquid and the connection 118 communicates freely with the reservoir. The angular movement of the valve member is limited by stop pins 126 and 127 fastened to the end of the body 111, as will be seen in Figure 9, so to be engaged by the handle 115. At its lower end the handle 115 is provided with a tip portion 128 conveniently composed of electrical insulating material, such as ebonite. This co-operates with an automatic switch 76 mounted upon a block 77 secured to the body 111. This switch, as before, comprises a plate 78, which in this instance is conveniently curved, and a pair of substantially J-shaped contact members 79 and 80. It will be seen that the curved extremities of these contact members normally engage the end parts of the plate 78. When the tip portion 128 reaches either extreme position of its range of angular movement it pushes the corresponding contact member 79 or 80 out of engagement with the plate 78.

The electrical driving means for operating the valve are shown in Figure 7 and comprise a rotary electric motor having a permanent magnet 52 and a wound armature 51, the latter having a commutator 59 and a pair of brushes 57 and 58 by which current is fed to the armature by way of the wires 55 and 56. Formed upon the armature shaft 53 is a main driving pinion 54 meshing with a first driven gear wheel 129 of relatively large diameter. This gear wheel 129 is freely rotatable upon a fixed pin 130 carried by the body 111, said wheel having an integrally formed second driving pinion 131 at its centre. This pinion meshes with a second gear wheel 132, which latter is freely rotatable upon an extension 133 of the armature shaft 53, an integrally formed pinion 134 being in mesh with a third gear wheel 135 freely rotatable upon the pin 130. This wheel also has an integral pinion, indicated at 136, in mesh with a fourth gear wheel 137, which latter is also freely rotatable upon the armature shaft extension 133. The extremity of this extension is supported by the valve member 113 in a freely rotatable manner. The gear wheel 137 is, on the other hand, in driving connection with the valve member 113 by a pair of pins 138. It will be readily appreciated that the gearing 54, 129—137 produces a considerable rotation, so that many revolutions of the armature 51 are necessary in order to move the valve member 113 from one operative position to the other; as a consequence, of course, a relatively small and light motor can satisfactorily operate the valve. The electric motor 51, 52 and automatic switch 76 are, of course, connected in the manner shown in Figure 5, and operate as described in connection therewith. When the valve is worked manually by the handle 115 sufficient power has to be exerted to rotate the armature 51, but if this is undesirable, it is simple to include a disconnectible or slipping clutch (not shown) in the reduction gearing.

If desired valve devices of the rotatable barrel or plug type can be arranged to be operated in the same direction by a non-reversing motor, each step of movement being 90° when the ports are arranged as shown in Figures 7 and 8. In this case the non-reversing type of circuit (see Figure 6) can be used, a convenient form of automatic switch being shown in Figure 10. The valve member is indicated at 113 and is driven so as to move angularly in an anti-clockwise direction. It is provided with a pair of diametrically opposed lugs or contact-operating cam projections 139 and 140. These co-operate alternately with a pair of switch devices 141 and 142 each comprising a fixed contact member 143 and a flexible contact member 144 having a nose portion 145. The resilience of the contact member 144 normally closes a pair of contacts 146, but when the nose portion 145 is engaged by one or other of the lugs 139, 140 the contacts 146 are separated. The contact members 143 are joined together and are connected to the wire 83, while the two contact members 144 lead respectively to the wires 84 and 85. By referring to Figure 6 it will be seen that when the arm 107 is in register with the stud 109 the motor is fed with current through the wire 85, so that the valve member 113 will be moved angularly until one or other of the lugs 139, 140 opens the switch device 141, thus bringing the motor 51 to a standstill. By moving the switch arm 107 into engagement with the stud 110 the supply of current to the motor is restored, and therefore the valve member 113 continues its movement until the other lug opens the switch device 142, this, of course, occurring after an angular movement of 90° has taken place.

The use of the invention is not restricted to valves having only two operating positions, as the device can readily be adapted for valves having three, four or even more different operating positions, the valve being automatically moved to any selected one of these positions by correspondingly adjusting the remote switch. Thus in Figure 11 an arrangement is shown in which a reversing motor is adapted to move a piston valve member or the like to any selected one of three positions. The motor armature is again indicated at 51 and is connected through reduction gearing (not shown) to the valve member to be operated, conveniently through a driving rod 65 carrying a metal collector disc 147. The centre of this disc is, for the present description, taken as the datum of the valve positions, the planes indicated in dotted lines at A, B and C being those which are occupied by the disc 147 for the corresponding three settings of the valve. The collector disc 147 is arranged to slide in electrical contact with either one of a pair of feed bars 148 and 149, depending upon the position occupied by said disc. Thus, when the disc is at position A, or between positions A and B, it is in engagement with the feed bar 148; when the disc 147 is precisely at position C, or is between the positions B and C, it is in engagement with the feed bar 149; on the other hand, when the disc 147 reaches position B it breaks contact with both bars during a small but nevertheless quite definite range of movement. Attached to the feed bar 148 is a spring contact arm 150 carrying at its extremity a contact 151 adapted normally to engage with a fixed contact 152. A thrust member 153 composed of insulating material is arranged to be engaged by the periphery of the disc 147 as the latter reaches position C, thus causing contacts 151, 152 to be separated. In a similar manner the feed bar 149 is provided with a spring contact arm 154 carrying a contact 155 and engaged by a thrust member 157. The contact 155 engages with a fixed contact 156.

The remote switch 97 is, in this instance, constituted by a switch arm 158 pivoted at 159 and adapted to be moved into engagement with any one of three contact studs $a$, $b$ and $c$. The system is fed with current from a centre-tapped battery, the respective sections of which are indicated at 106a and 106b, the tapping being connected by a wire 55 to the armature 51. One outside pole of the battery is connected by a wire 160 to the feed bar 148, while the other outside pole is connected by a wire 161 to the feed bar 149. Stud $a$ is connected to the fixed contact 156 by wire 162 corresponding to position A, stud $b$ is connected to the disc 147 by wire 163, and stud $c$ is connected by wire 164 to the fixed contact 152 corresponding to position C. The switch arm 158 is joined to the motor 51 by the wire 56.

The system shown in Figure 11 operates as follows. Assuming that it is desired to move the disc 147 (and the valve member coupled therewith) to position C, the switch arm 158 is placed in engagement with the contact stud $c$. Current then flows from the battery section 106a through wire 160, contacts 151 and 152, and wire 164 to the stud $c$, and thence through the switch arm 158 and wire 56 through the motor 51 (from left to right) to the centre-tapping of the battery. The motor 51 is so arranged that this moves the disc 147 towards the right, and when the position C is reached, the thrust member 153 is pressed upwards and breaks the circuit at 151, thus stopping the motor. The same effect can be produced by placing the contact arm 158 in engagement with the stud $a$ to move the disc 147 to the position A, the lower section 106b of the battery then coming into action so as to cause the motor 51 to run in the opposite direction until the circuit is broken by the disengagement of contacts 155 and 156. To move the disc 147 in either direction to the middle position B the switch arm 158 is brought into engagement with the stud $b$, and the motor 51 then receives current from either half of the battery, depending upon the direction of movement which is necessary; thus, assuming that the disc 147 is at position C, current flows from the battery section 106b through wire 55 to the motor 51, thence through the switch arm 158, stud $b$, and disc 147 to the feed bar 149, and thence back to the battery by wire 161. Thus the disc 147 is moved to the left until it breaks contact with the feed bar 149 upon reaching the position B, at which point the supply of current to the motor 51 is interrupted and the disc 147 is arrested. On the other hand if the disc 147 is at position A the motor 51 receives current from the upper section 106a of the battery by way of the feed bar 148, so that said motor is driven in the opposite direction and has its current supply interrupted as the disc 147 reaches the position B.

In systems employing valve devices such as that shown in Figure 4, where a motor of the non-reversing type is permissible, provision can readily be made for operating valves having any number of settings within practical limits, and an arrangement suitable for a four-position valve is shown in Figure 12. A disc or equivalent member 147 mounted upon the driving rod 65 is arranged to move in common with the valve alongside a metal bar 165 constituting a shunt connection. Mounted upon this bar are a number of contact arms 166, 166a, 166b, 166c, and 166d. These are insulated from the bar 165, but are provided, each at its extremity, with a contact 167a, 167b, 167c or 167d adapted normally to engage a corresponding contact carried by the bar 165. Moreover the contact arms 166a—d are arranged to be pushed upwards, each by a corresponding thrust member composed of insulating material, said thrust members being indicated at 168a—d. Thus as the disc 147 reaches each of the successive positions A—B—C—D it lifts the corresponding thrust member 168 and breaks the contact at 167. The contact arms 166a—d are connected respectively to the contact studs a—d of the remote switch 97, which latter has a switch arm 158 adapted to be brought into engagement with any selected one of said studs. A battery 106 is connected between the switch arm 97 and the motor 51 by means of the wire 55, while the wire 56 from the other side of the motor leads to the bar 165. It will be seen that the disc 147, if driven continuously by the motor 51 through crank or cam mechanism, would reciprocate between the positions A and D; therefore by placing the switch arm 158 into engagement with any selected one of the studs a—d, this reciprocatory movement can continue only until the particular contact arm 166a—d is actuated by the disc 147 to interrupt the supply of current to the motor. The disc 147 thereupon comes to a standstill and cannot be again actuated until the switch arm 158 is brought into engagement with a different stud.

It will be understood that the arrangements which have been described are given merely by way of example, and that various modifications are possible to suit requirements. For instance, it may be desirable in some cases to use an electric motor having an energised field, in which case the field winding can be connected directly across the battery so as to enable the motor to be reversed by the action of the remote switch; of course, a circuit-breaking switch actuated by or in common with the remote switch would normally be provided for breaking the field circuit when the motor is not running.

A fluid pressure control system having controlling means according to the invention may obviously be utilised for purposes other than the operation of aircraft under-carriages, flaps and other controls, being equally useful for fluid pressure controls on vehicles or ships, or in industrial plants.

What I claim is:

1. A device for controlling pressure fluid to a hydraulic circuit comprising a valve body having inlet, outlet and exhaust ports, a bore in said body intersecting said ports, a piston valve member slidable longitudinally in said bore from one end position to the other to control the fluid pressure at said ports, an electric motor and an electric circuit therefor including a source of current and a switch remotely located from said valve body for connecting said source of current to said motor, means connecting the motor in driving relationship to said valve member including a speed reducing mechanism comprising a crank and driving rod driven by the motor and arranged to be drivably connected to the valve member so that many revolutions of said motor are necessary to move the valve member from one of its end positions to the other, at least two other switches in the electric circuit constructed and arranged to be operated in response to movement of the valve member to cut off the current to the motor when the valve member reaches its end positions, said means including a clutch mechanism connecting said driving rod to the valve member and comprising a coupling secured to one end of said valve member and having a longitudinal bore therein to receive said driving rod, a groove on the driving rod, a spring clip carried by said coupling and constructed and arranged to engage said groove, and manual means secured to the other end of said valve member for urging the same in a direction to disengage said clip from the groove to move the valve member to control the fluid pressure at the ports independently of said electric motor.

2. A device for controlling pressure fluid to a hydraulic circuit comprising a valve body having inlet, outlet and exhaust ports, a bore in said body intersecting said ports, a piston valve member slidable longitudinally in said bore from one end position to the other to control the fluid pressure at said ports, an electric motor and an electric circuit therefor including a source of current and a switch remotely located from said valve body for connecting said source of current to said motor, means connecting the motor in driving relationship to said valve member including a speed reducing mechanism comprising a driving rod having a rack thereon and a pinion meshing with said rack to be driven by said motor, and arranged to be drivably connected to the valve member so that many revolutions of said motor are necessary to move the valve member from one of its end positions to the other, at least two other switches in the electric circuit constructed and arranged to be operated in response to movement of the valve member to cut off the current to the motor when the valve member reaches its end positions, said means including a clutch mechanism connecting said driving rod to the valve member and comprising a coupling secured to one end of said valve member and having a longitudinal bore therein to receive said driving rod and means releasably connecting said coupling to the driving rod, and manual means secured to the other end of said valve member for disconnecting the coupling from the driving rod to thereby move the valve member to control the fluid pressure at the ports independently of said electric motor.

3. A device for controlling fluid under pressure to a hydraulic system comprising a valve body having a plurality of ports therein, a bore in the body communicating with said ports, a piston valve member having at least two positions in said bore and slidable longitudinally therein from one position to another to thereby control the flow of fluid at said ports, an electric motor and an electric circuit therefor, a switch in the circuit and remotely located from said valve body for energizing the motor for selectively positioning said piston valve member in one of its positions, means drivably connecting the motor to the piston valve member, said means including a clutch mechanism interposed between said piston valve member and said motor and comprising a pair of telescopically slidably members, one of which is provided with a groove at one end, and a groove engaging element carried by the other telescopic member and constructed and arranged for engagement with said groove, a gear threaded axially and drivably related to said motor, said one of the telescopic members being constructed and arranged so that its other end threadedly engages said gear for driving relationship therewith, at least two other switches in the electric circuit constructed and arranged so that one or the other of the switches will be operated in response to the movement of the piston valve member to its selected position to thereby de-energize the motor, and means for manually moving the piston valve member to preselected positions to control the flow of fluid at said ports independently of said electric motor.

4. A device for controlling fluid under pressure to a hydraulic system comprising a valve body provided with a plurality of ports therein, a valve member arranged in the valve body for movement to preselected positions, means including an electric circuit and motor therein drivably connected to said valve member for moving the latter to one of its preselected positions, and manual means for moving the valve member to one of its preselected positions, said first-mentioned means embracing a clutch mechanism operative upon manual movement of said valve member for disengaging said motor from driving engagement with siad valve member, said clutch mechanism comprising a pair of telescopically slidable members, one of which is grooved and the other of which carries an element formed for engagement with said groove.

5. A device for controlling fluid under pressure to a hydraulic system comprising a valve body provided with a plurality of ports therein, a bore in the body intersecting said ports, a valve member slidably located in the bore for movement from one end of the bore to the other, an electric circuit including an electric motor, a switch in the circuit remotely located from said valve body for controlling said motor, means drivably connecting the motor to the valve member for moving the latter, at least two other switches in the circuit arranged so that one or the other will be actuated by the valve member as it approaches either end of said bore for controlling said motor, and means for manually moving the valve member to its end positions in the bore, said first-mentioned means including a clutch mechanism operative upon manual movement of said valve member for disengaging said motor from driving-engagement with said valve member, said clutch mechanism comprising a pair of telescopically slidable members, one of which is grooved and the other of which carries an element formed to engage said groove.

SYDNEY MacDONALD PARKER.

REFERENCES CITED

The following references are of record in the file of this patent:

UNITED STATES PATENTS

| Number | Name | Date |
| --- | --- | --- |
| 679,518 | Skirrow | July 30, 1901 |
| 956,772 | Knauf | May 3, 1910 |
| 1,724,635 | Bath | Aug. 13, 1929 |
| 1,749,310 | Belcher | May 4, 1930 |
| 1,948,709 | Hackethal | Feb. 27, 1934 |
| 1,955,154 | Temple | Apr. 17, 1934 |
| 2,029,378 | Koons | Feb. 4, 1936 |
| 2,057,088 | DeMillar | Oct. 13, 1936 |
| 2,127,265 | Martin | Aug. 16, 1938 |
| 2,213,968 | Rose | Sept. 10, 1940 |
| 2,283,397 | Tucker | May 19, 1942 |
| 2,298,051 | Gordon | Oct. 6, 1942 |
| 2,317,549 | Muller | Apr. 26, 1943 |
| 2,327,980 | Bryant | Aug. 31, 1943 |